United States Patent [19]

Baker

[11] 4,130,853
[45] Dec. 19, 1978

[54] GLOW PLUG TEMPERATURE CIRCUIT

[76] Inventor: Roxton E. Baker, 56 South Rd., Ellington, Conn. 06029

[21] Appl. No.: 771,331

[22] Filed: Feb. 25, 1977

[51] Int. Cl.² ............................................. F23Q 7/00
[52] U.S. Cl. ................................... 361/264; 219/492; 219/497; 219/501; 219/504
[58] Field of Search ............... 361/264; 219/490, 492, 219/497, 498, 499, 482, 501, 504

[56] References Cited

U.S. PATENT DOCUMENTS

| | | | |
|---|---|---|---|
| 3,476,914 | 11/1969 | Cussen | 219/499 |
| 3,789,190 | 1/1974 | Orosy et al. | 219/501 |
| 3,857,017 | 12/1974 | Whittier | 219/501 |
| 3,866,587 | 2/1975 | Knapp | 219/501 |
| 3,869,597 | 3/1975 | Strange | 219/497 |
| 3,881,085 | 4/1975 | Traister | 219/482 |
| 4,002,882 | 1/1977 | McCutchen | 219/497 |

Primary Examiner—J. V. Truhe
Assistant Examiner—Clifford C. Shaw

[57] ABSTRACT

An apparatus for regulating the temperature of a model engine glow plug filament. Between pulses from a power circuit, an amplifier applies its output voltage to a filament current path comprising the filament and a resistive circuit. By means of feedback to the amplifier, the filament voltage is kept at a predetermined reference, and the output voltage is thereby an indication of the filament resistance, which is related to its temperature. The output voltage charges a capacitor whose discharge time determines the "on" time of the power pulses. By this method, temperature is regulated, and power is totally cut off when the filament temperature gets sufficiently high.

2 Claims, 1 Drawing Figure

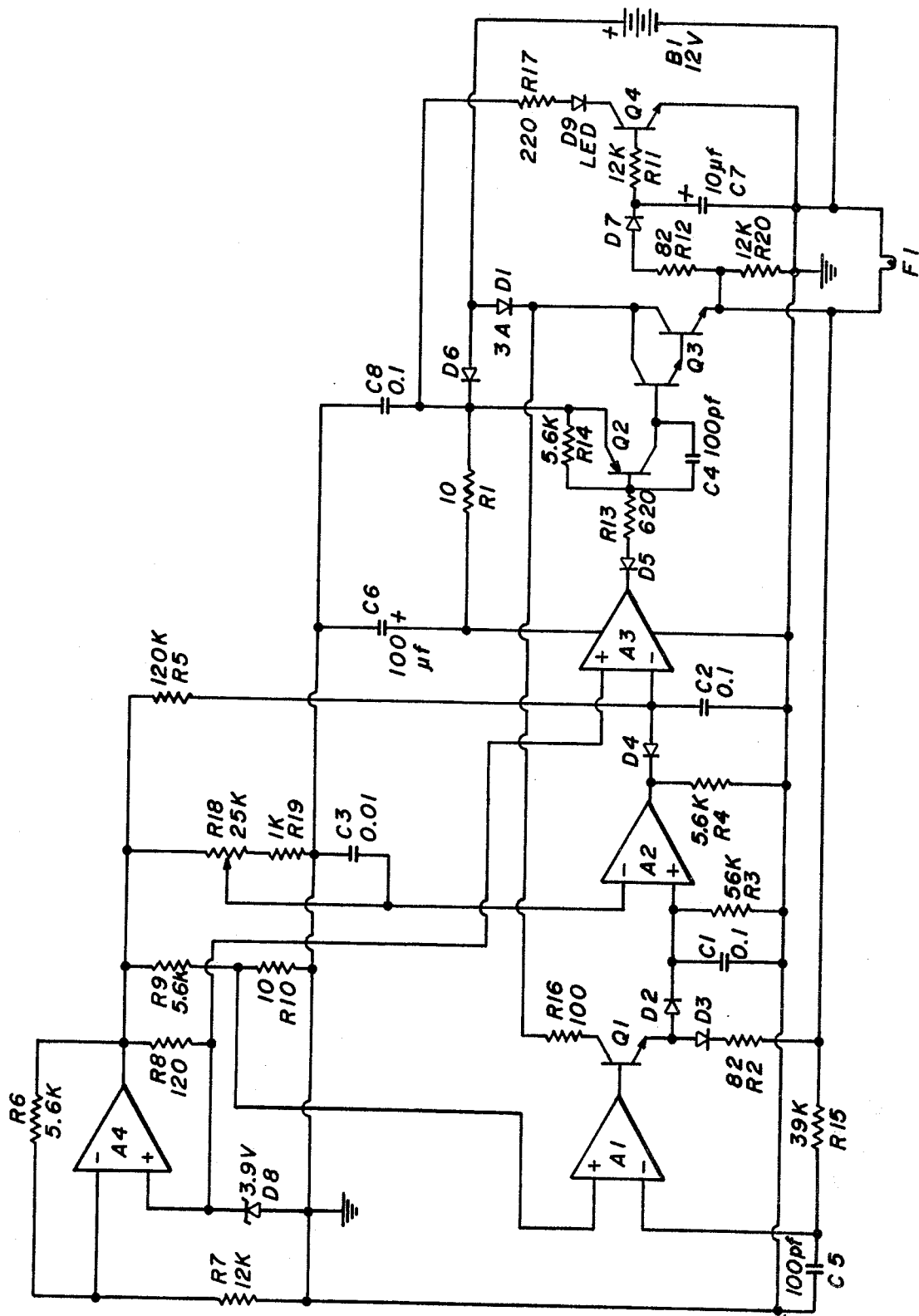

GLOW PLUG TEMPERATURE CIRCUIT

BACKGROUND OF THE INVENTION

The present invention relates to model engine glow plug filament temperature control, and in particular to a method and apparatus for measuring the temperature of the filament to be controlled and generating a control signal therefrom.

Small gas model engines, such as those found in radio-controlled airplanes, cars, and boats, have their fuel-air mixture ignited by a glow plug which screws into the head of the engine. When the engine is running in its normal range of RPM, the heat of combustion of the engine is sufficient to keep the tip of the glow plug and its filament red hot and thus to ensure ignition of the mixture when it is compressed in the cylinder.

However, when the engine is initially started, the glow plug is cold and must be heated in some way before it can ignite the fuel. This is the purpose of the glow plug filament. It is a coil of resistive wire in the tip of the glow plug, and the application of electric power to external points on the glow plug will cause the filament to glow red hot. Typically, 3 amperes is required. This electric power is applied only long enough for the engine to be started, because the heat of combustion will now keep the plug red hot and it is undesirable to have the plug heated by both means since the filament can be stressed and its life considerably shortened.

The engine can be started by manually flipping the propeller around (in the case of a model airplane) or, as is often done, a hand-held electric starter can be used to more rapidly and continuously flip the propeller around until the engine fires.

For many years the means most often used to light the glow plug was a 1.5 volt dry cell. This had numerous disadvantages, the foremost being loss of capacity in cold weather and short life due to the large current required.

Later advances in the art utilized instead a switching-circuit approach wherein a much higher voltage (usually 12 volts) is repetitively switched or pulsed into the glow plug, the duty cycle of this pulse train being initially adjusted to provide the correct amount of average power to the glow plug to keep it red hot. The advantage of the switching action is that much less average current is drawn from the battery, typically one-half ampere. Also, being either "on" or "off," the switching element does not dissipate much power and runs fairly cool.

The most recent advances in the art have in addition used temperature feedback directly from the plug filament to modulate the duty cycle of the pulse train. Since the filament's resistance decreases when its temperature decreases, the resistance can be sensed and any deviation from the desired value can be used to cause a correcting change in the pulse train duty cycle. This technique gives very easy starting of model engines under the most difficult circumstances, such as flooding, because the plug filament receives as much power as is needed to keep it red hot.

Problems still existing in the prior art circuits include the following. Stability with respect to ambient temperature and component aging is poor, requiring frequent readjustment of the temperature adjustment control. The operator of these prior art circuits often lacks confidence that the plug is indeed at the correct brightness, and he must remove it from the engine to examine it.

Another problem as yet unsolved in the prior art is the sensitivity of these complex circuits to drops in the main supply voltage. The battery used to power the glow plug heating device is very often the same 12 volt battery used to power the electric starter. The starter can draw 15 amperes when attempting to turn an engine. The 12 volt battery used often cannot sustain this without a substantial drop in terminal voltage. Drops to 8 volts are not uncommon. This occurs when it is most important that the glow plug filament be red hot. The prior art circuits have no provision for internal voltage stabilizing so that supply voltage drops can be dependably rejected. At low supply voltages their action becomes unpredictable.

An additional problem remaining in the prior art is that of turning off the pulses once the engine has started. To least affect the life expectancy of the filament it is necessary to remove as completely as possible all electric power from the filament immediately after the engine starts. The resistance-measuring technique will always require some small measuring current to flow through the filament, but the high-amperage pulses should be terminated. Also, in applications such as larger "scale" aircraft where the glow plug heating circuit may remain on board and permanently connected to the glow plug, it is desirable to minimize the current drawn from the battery, which also must be carried. This requires termination of the pulses.

However, it is not sufficient to merely terminate the pulses when filament resistance rises. In applications such as idling the engine, which may occur in larger-scale aircraft, or when "breaking-in" an engine by running it with an excessively rich fuel mixture, the filament-heating circuit is most useful if it can instantaneously turn off and on, for only one pulse if necessary, to assist the engine in keeping the glow plug red hot. The problems involved in a design of this type have not been resolved by the prior art. A totally automatic filament heating circuit that can turn the pulses off and on as required, without requiring the use of a throttle-position sensing micro switch, as has been done, is not available in the prior art.

SUMMARY OF THE INVENTION

It is accordingly an object of the present invention to remove these deficiencies that exist in the prior art.

The present invention is a circuit for sensing the temperature of a pulsed glow plug filament. A resistor circuit in series with the filament forms a filament-current path across which an amplifier output voltage is applied. The filament voltage is fed back to the amplifier in such a manner as to keep the filament voltage constant, the variable output of the amplifier thereby being an indication of filament resistance and thus of filament temperature. In addition, when power is applied to the filament, the feedback causes the amplifier to turn off.

In a preferred embodiment of the invention, a power control circuit including the temperature circuit includes a capacitor connected to be charged but not discharged by the amplifier, and the capacitor voltage is compared to a setpoint voltage by a means for withholding power from the filament when the capacitor voltage is below the setpoint voltage. Since the capacitor is allowed to discharge during applications of power, the "on" time of the power pulses is determined by the voltage to which the capacitor is charged, which in turn is determined by glow plug temperature. In addition, when the glow plug temperature is sufficiently high, capacitor voltage never exceeds setpoint voltage, so a complete power turn-off is inherent in the operation of the present invention.

BRIEF DESCRIPTION OF THE DRAWING

The FIGURE is a schematic of a preferred embodiment of the present invention.

DETAILED DESCRIPTION OF THE PREFERRED EMBODIMENT

The FIGURE shows a preferred embodiment of the present invention, in which a filament F1 is being controlled. The filament may be viewed as a temperature-variable resistance element. Typically, F1 will have a positive temperature coefficient of resistance if it is of the type usually included in commercially available glow plugs.

Referring now in more detail to the FIGURE, amplifier A4 and its associated biasing components, resistors R6, R7, and R8 and zener diode D8, form a voltage reference circuit that supplies a plurality of stable reference voltages to the remaining circuitry. For the preferred embodiment, amplifier A4 is one of four operational amplifiers in a single integrated circuit package, such as National Semiconductor LM324, which is particularly suited to the present application because of its single-polarity supply voltage requirement. Amplifiers A1, A2, and A3 are in the same package with A4, so power is only shown applied to one of them, since only two integrated circuit terminals are required to connect all of the amplifiers to the power supply.

The design of the voltage reference circuit is common in the art, and its operation may be described briefly as follows. Zener diode D8 is supplied with current through resistor R8 from the output of amplifier A4. This current is approximately 15 milliamperes. The current flowing through D8 causes it to develop at its cathode terminal a voltage of approximately 3.9 volts. This voltage is applied directly to the non-inverting input terminal of amplifier A4. Additionally, feedback resistor R6 supplies current to resistor R7, and the voltage developed at the junction of these two resistors is applied directly to the inverting input terminal of amplifier A4. The magnitude of this voltage is determined by the ratio of resistance values of R6 and R7, and in the preferred embodiment these resistors are chosen such the voltage is approximately 3.9 volts. Should the voltage at the output of amplifier A4 attempt to decrease in magnitude due to disturbances of an electrical or thermal nature elsewhere in the circuitry, then the voltage at the inverting input of A4 would decrease, causing the output of A4 to increase. This negative feedback action serves to keep the output of A4 stable at that voltage that will cause its inverting terminal voltage to equal its non-inverting terminal voltage. In the preferred embodiment, the stable output voltage can be seen to be 5.7 volts. Zener diode D8 has its stability enhanced by the reception of current that is almost constant at the 15 milliamperes mentioned previously. This results in circuit action that is more stable than it would be if D8 were biased from the main power supply voltage, because in the latter case any noise or disturbances in this power supply voltage could affect all of the circuit reference voltages with detrimental results.

Two resistors, R9 and R10, are also driven from the output of A4. These act simply as a voltage divider to provide a very small reference voltage to the non-inverting input terminal of amplifier A1. In the preferred embodiment this reference voltage is approximately 10 millivolts. Also driven from the output of A4 is the first main terminal of potentionmeter R18, whose second main terminal is connected to resistor R19, which in turn is connected to ground. Thus, approximately 5.48 volts is impressed across the potentiometer. The wiper of the potentiometer is connected to a capacitor C3. This capacitor in conjunction with the resistance of the potentiometer comprise a low-pass filter, which serves to reject any noise present in the surroundings so that the inverting input terminal of amplifier A2, to which the wiper of the potentiometer is also connected, will not be affected by this noise. The inverting terminal of A2 thus receives a stable, noise-free signal from potentiometer R18, and this voltage can be manually adjusted from approximately 0.22 volts to approximately 5.7 volts.

Additionally, the voltage reference circuit comprising amplifier A4 and its associated components as described above also provides a stable 3.9 volt reference voltage to the non-inverting input terminal of amplifier A3 and a stable 5.7 volt reference voltage to the timing circuit comprising resistor R5 and capacitor C2.

Amplifier A1, together with transistor Q1, diode D3, resistors R2, R15, R16, capacitor C5, and the filament F1, constitute the filament resistance-measuring circuit. The operation of this circuit can be understood by reasoning as follows. Assume that power transistor Q3 is cut off and thus is not supplying current to filament F1. The voltage at the non-inverting terminal of A1 is approximately 10 millivolts. This will cause the output of A1 to rise in voltage until the current through R16, Q1, D3, R2, and F1 is sufficient to cause the voltage at the inverting terminal of A1 to also equal 10 millivolts. This voltage is a result of the current passing through the resistance of filament F1. Should external disturbances cause the resistance of F1 to decrease slightly, a slightly lower voltage will be present at the inverting terminal of A1, which will cause the output of A1 to increase and thus increase the current through F1 until the voltage at the inverting terminal of A1 again equals 10 millivolts. Note that the voltage across F1 appears almost unchanged at the inverting terminal of A1 because only a negligibly small bias current flows through resistor R15. This resistor in conjunction with capacitor C5 serves as a low-pass filter to keep noise from affecting the inverting terminal of A1.

Similarly, it can be seen that should external disturbances cause the resistance of filament F1 to increase, the voltage at the inverting terminal of A1 will increase slightly, causing the output of A1 to decrease until the voltage at the inverting terminal of A1 is again restored to 10 millivolts. Transistor Q1 is used as a current booster since the output current capability of A1 is insufficient to drive the circuit by itself. Approximately 20 to 40 milliamperes of current is required.

It is accordingly apparent that amplifier A1 and transistor Q1 together constitute a differential amplifier whose inverting input is fed by a reference voltage, and whose output voltage is applied across a filament-current path comprising D3, R2, and F1. Further, it can be seen that the combination of this differential amplifier and the voltage reference comprising A4 and its associated circuitry constitute a means for applying a voltage across the filament-current path that is sufficient to maintain a predetermined voltage (10 millivolts) across the filament.

The voltage at the output of A1 is applied, minus two diode drops totalling approximately 1.4 volts due to Q1 and diode D2, to the non-inverting terminal of amplifier A2. Amplifier A2 is used as a comparator with no feedback directly around it. In normal operation, potentiometer R18 will have been adjusted such that the stable voltage at the inverting terminal of A2 is at some value below that range of voltages through which the non-inverting terminal is expected to vary during the starting of the model engine due to the changing resistance of filament F1. Since the voltage at the non-inverting terminal of A2 is greater than the voltage at the inverting terminal, the output of A2 will be saturated high at approximately 10 volts. Assuming that the voltage across capacitor C2 had previously been forced to be close to zero volts by the output of A2 being saturated low, it can be seen that diode D4 is reverse-biased and therefore non-conducting, and that C2 is now charging up towards 5.7 volts through resistor R5, which is connected to the 5.7-volt reference voltage described previously. The voltage across capacitor C2 is applied to the inverting input terminal of amplifier A3. Amplifier A3 also is used as a comparator with no direct feedback around it. Its non-inverting input terminal is supplied with a constant 3.9 volts from the voltage reference circuit. Assuming that the voltage across C2 has not yet reached 3.9 volts, it is clear that the output of amplifier A3 is saturated high at approximately 10 volts. This reverse-biases diode D5 and prevents any current from flowing out of the base of transistor Q2. This means that Q2 is cut off, and therefore no current can flow out of its collector into the base of power transistor Q3. Therefore, Q3 is cut off, which satisfies the original assumption of circuit conditions.

Approximately 16 milliseconds after capacitor C2 begins charging up through resistor R5, the voltage across C2 will increase just past 3.9 volts. This will cause the output of amplifier A3 to saturate low at approximately zero volts. Diode D5 will accordingly be forward biased, causing transistor Q2 to turn on fully into saturation by means of the current flowing out of its base through D5 and R13. The resulting collector current of Q2 flows into the base of power transistor Q3, causing it to turn on. The resulting large collector current of Q3 flows also through filament F1. In the preferred embodiment, transistor Q3 is a darlington power transistor with very high current gain, and the resulting collector current which passes through F1 may have a magnitude of 15 amperes or more.

This large current through filament F1 causes a voltage of 6 volts or more to be developed across F1, and it also causes the filament to increase in temperature. The voltage developed across F1 appears also at the inverting terminal of amplifier A1, as described previously, by means of resistor R15 and capacitor C5. This voltage is much greater in magnitude than the 10 millivolts being applied to the non-inverting terminal of A1, and thus the output of A1 is forced to saturate low at approximately zero volts. This action results in transistor Q1 becoming cut off since it can no longer receive base current from amplifier A1. Since Q1 can no longer pass current, the voltage at its emitter drops to approximately zero volts. This drop in voltage causes diodes D2 and D3 to become reverse-biased since the voltage at the cathode of each is greater than the 0 volts present at their anodes.

When diode D2 becomes reverse-biased, capacitor C1 is no longer being held at some voltage due to current through D2. Accordingly, C1 begins to discharge through resistor R3. The time constant of this discharge is 5.6 milliseconds. At some time after the beginning of the discharge of C1, the voltage across C1 will decrease to just below the stable voltage that is being applied to the inverting terminal of amplifier A2. In the preferred embodiment, the time interval that is required for C1 to discharge to this point is typically in the range of 0.3 to 4 milliseconds. The actual time duration for any given cycle of circuit operation will be determined by the difference between the stable voltage at the inverting terminal of A2 and the initial voltage at which C1 was held, prior to discharge, by the action of the filament resistance-measuring circuit comprising amplifier A1 and its associated components.

When the voltage across capacitor C1 decreases below the voltage being applied to the inverting terminal of amplifier A2, the output of A2 will saturate low at approximately zero volts. Resistor R4 assists amplifier A2 at this time in rapidly discharging capacitor C2 down to approximately 0.7 volts through diode D4, which has become forward-biased. This discharge of C2 results in the voltage at the inverting terminal of amplifier A3 becoming less than the stable 3.9 volts that is present at the non-inverting terminal of A3. Therefore, the output of amplifier A3 saturates high at approximately 10 volts. This action reverse-biases diode D5 and cuts off transistors Q2 and Q3 as described previously. This completes one cycle of circuit operation.

In order to further explain the function of the present invention, the basic sequence of events of a second cycle of operation will be briefly described. Circuit action is identical to that of the first cycle of operation with the exception of the discharge time of capacitor C1. Beginning at the time at which capacitor C2 has been discharged and transistors Q2 and Q3 cut off, the inverting terminal of amplifier A1 is no longer being overdriven by a large voltage being impressed across filament F1. Therefore, amplifier A1 together with transistor Q1 and diode D2 again rapidly charges capacitor C1 back up to the voltage that represents the new resistance of filament F1. This resistance will in general be different from the filament resistance in the previous cycle because in the meantime the filament has received the large current pulse from Q3 and may also have been subjected to environmental disturbances such as cold air or fuel coming in contact with the filament. The present invention acts to cause the time duration of the large current pulse, as determined by the discharge time of capacitor C1, to vary so as to tend to compensate for any external disturbances that act to change the temperature of the filament F1.

When capacitor C1 has charged to this new voltage representing the new resistance of the filament, the output of amplifier A2 saturates high at approximately 10 volts, thus reverse-biasing diode D4. Note that all of this occurs immediately after cessation of the current pulse through transistor Q3. With D4 non-conducting, capacitor C2 begins charging up again through R5. The voltage across C2 will eventually increase beyond 3.9 volts, thereby causing amplifier A3 to change state such that its output saturates low at approximately 0 volts. This forward-biases diode D5 and turns on transistors Q2 and Q3. This is the beginning of the "on" time of the circuit, during which power is applied to filament F1. This "on" time is determined by the discharge time of C1 from its initial voltage, as fixed by amplifier A1, down to the stable voltage being applied to the inverting terminal of amplifier A2. The initial voltage of C1 depends on the resistance of the filament. If the resistance of the filament has decreased since the previous cycle, the initial voltage on C1 will be higher and the "on" time of power application to the filament will be longer. The "off" time of the circuit is constant at approximately 16 milliseconds due to the charging of C2, descri- previously. Since filament F1 has the characteristic that its resistance decreases as its temperature decreases, it is clear that the overall action of the circuitry of the preferred embodiment will act to keep the filament from changing temperature, or, equivalently, to keep it at a constant temperature as adjusted initially by the reference voltage applied to the inverting terminal of amplifier A2.

In the preferred embodiment, the means for generating the input to the non-inverting terminal of A2 is potentiometer R18; however, any of the voltage generating means known in the art may be employed to develop this reference voltage. Such means might include generation of the voltage by an analog function generator circuit, or by any type of digital-to-analog converter driven by some means of selecting fixed increments of voltage, or driven by a calculating machine that might make use of external environmental sensors and/or internal calculating algorithms to determine the desired temperature of the filament. It is a feature of the present invention that such controlling machinery might be very easily adapted to control the filament temperature, since all that is required is an analog voltage. This voltage source need not supply much current, since it is input to the high impedance of an operational amplifier. In contrast, methods previously used to control filament temperature are not readily adapted to external setting of the desired temperature by means other than a potentiometer or variable resistor.

Another feature of the present invention is that the complete removal of power from the filament after the engine has reached self-sustaining conditions is inherent in the operation of the circuit. It will be recalled that the inverting terminal of amplifier A2 is set at a voltage that is low enough so that under ordinary startup conditions it will be lower than the voltage to which C1 is charged when A1 and Q1 are turned on. During self-sustaining engine operation, however, the glow plug temperature will increase to a value greater than that required to start the engine. A proper setting of potentiometer R18 will result in a voltage between that which corresponds to the startup temperature and those voltages that correspond to temperatures achieved during self-sustaining operation. With such a setting, the output of A2 will not go high during the "off" time of the circuit because C1 will be kept at a voltage below that of the wiper of R18 if the higher self-sustaining temperatures have been reached. As a result, C2 will be kept from charging, A3 will be kept from drawing current from the base of Q2, and power will not be applied to F1. The operator need not disconnect the circuit when the engine has started, and no extra means need be included to effect disconnection. The circuit can remain connected, but no power at all will be applied from the power circuit unless the glow plug again falls below the desired temperature. Thus, the possibly harmful temperatures that could result from the application of power during self-sustaining operation are avoided.

Additionally, it is a feature of the present invention that the circuit "on" and "off" times as well as the resistance-measuring circuit reference voltage applied to amplifier A1 are all derived from a very stable voltage-reference circuit. In the preferred embodiment this comprises amplifier A4 and its associated biasing components previously described. This results in no dependence of circuit operation upon ambient temperatures and very good rejection by the circuit of electrical noise whether received as electromagnetic radiation or received through the main power lines from the external source B1. Equally good rejection of voltage changes in the external power source B1 is also achieved. This is very important because B1 is most often a small battery that is simultaneously being subjected to other severe electrical loads and also perhaps to low ambient temperatures. In the preferred embodiment, the nominal voltage of B1 is 12 volts. The use of an electric starter, which is common in modeling, can cause the battery voltage to drop below 8 volts. The preferred embodiment, by the use of the stable reference source A4 which develops reference voltages well below 8 bolts for all of the critical parts of the circuit, will still be able to cause the filament F1 to glow at a level sufficient for engine starting in spite of battery voltage drops down to 7.5 volts.

There remain to be described some further components in the circuitry of the preferred embodiment. Diodes D1 and D6 serve to prevent damage from the accidental reverse application of the main power supply lines to the circuitry of the preferred embodiment. Diode D1 supplies current to power transistor Q3 and as a result must carry the high pulse currents during the circuit "on" times. These high currents can cause forward voltage drops across D1 of more than 1 volt. To prevent these voltage transients from reaching the control circuitry, diode D6 is used separately to provide reverse polarity protection for the remainder of the circuitry. It carries no large transient currents and thus does not couple unnecessary noise into the more sensitive circuits. Additionally, resistor R1 and capacitors C8 and C6 further smooth the supply voltage to the amplifier circuitry.

Circuitry for driving an indicator light is also provided in the preferred embodiment. This is comprised of resistors R12, R11, and R17, diode D7, capacitor C7, transistor Q4, and light-emitting diode D9. Operation is as follows. When the previously described "on" voltage pulses are impressed across filament F1, diode D7 becomes forward-biased and current flows through R12 and D7 into capacitor C7, thus developing a voltage across C7. Current also flows through R11 and into the base of Q4. The resulting collector current of Q4 flows also through R17 and D9, causing the light-emitting diode to glow. Capacitor C7 acts to maintain the base current to Q4 even when the filament "on" voltage is no longer present and D7 is reverse-biased. Thus the light-emitting diode continues to glow until the next "on" pulse refreshes the charge in C7. This indicator light assures the operator that the filament is actually receiving pulses. This is an improvement over common practice, which is to indicate merely that supply voltage is present and/or that the filament F1 has electrical continuity.

Further details of the preferred embodiment include the function of resistor R16, which serves to reduce the power dissipation in transistor Q1 by reducing the voltage applied to its collector. Resistor R14 assures that when the output of amplifier A3 is saturated high at approximately 10 volts, leakage currents will not cause a sufficient base-emitter voltage at transistor Q2 for the transistor to turn on when it should be cut off. Resistor R20 acts to keep the leakage currents of Q3 from charging C7 and giving a false indication in D9 of pulses being present when the filament has been disconnected and there are in fact no pulses present. Capacitor C4 compensates for some phase shifts in the circuitry and improves the rise and fall times of voltages in the power output circuit.

What is claimed is:

1. In combination with a circuit for applying power to a glow-plug filament having a positive temperature coefficient of resistance, the power being applied for time periods dependent on a temperature signal appearing at an input terminal of the power-applying circuit, a glow-plug temperature circuit, comprising:
   a. a resistor circuit in series with the filament, thereby forming a filament-current path; and
   b. means for applying an output voltage across the path sufficient to maintain a predetermined voltage across the filament, the output voltage also being applied to the input terminal of the power-applying circuit, the output voltage thereby being the temperature signal, which increases as the filament resistance decreases and decreases as the filament resistance increases, thus exhibiting an inverse relationship to temperature.

2. A temperature circuit as recited in claim 1, wherein the means for applying voltage comprises:
   a. A differential amplifier having an output terminal and inverting and non-inverting input terminals, the voltage at the output terminal being applied across the path, and the inverting terminal being connected to receive the filament voltage; and
   b. means for maintaining a constant reference voltage at the non-inverting terminal.

* * * * *